(12) United States Patent
Shin et al.

(10) Patent No.: US 8,572,638 B2
(45) Date of Patent: Oct. 29, 2013

(54) MOTOR AND OPTICAL DISK DRIVE USING THE SAME WITH CHAMFERED AND FRACTURED PARTS ON ROTOR CASE

(75) Inventors: Dong Yeon Shin, Gyunggi-do (KR); Dae Lyun Kang, Gyunggi-do (KR)

(73) Assignee: Samsung Electro-Mechanics Co., Ltd, Suwon (KR)

( * ) Notice: Subject to any disclaimer, the term of this patent is extended or adjusted under 35 U.S.C. 154(b) by 0 days.

(21) Appl. No.: 13/067,734

(22) Filed: Jun. 22, 2011

(65) Prior Publication Data
US 2012/0079511 A1 Mar. 29, 2012

(30) Foreign Application Priority Data
Sep. 28, 2010 (KR) .......................... 10-2010-0093508

(51) Int. Cl.
*G11B 17/03* (2006.01)
*G11B 17/028* (2006.01)

(52) U.S. Cl.
USPC ....................................................... 720/696

(58) Field of Classification Search
USPC ......... 720/695, 696; 360/98.07, 99.04, 99.08; 29/603.03; 310/67 R
See application file for complete search history.

(56) References Cited

U.S. PATENT DOCUMENTS

| | | | |
|---|---|---|---|
| 5,256,922 A * | 10/1993 | Tanaka et al. ................... | 310/71 |
| 5,744,881 A | 4/1998 | Ishizuka et al. | |
| 2003/0178904 A1 | 9/2003 | Miyamoto | |
| 2006/0097592 A1 | 5/2006 | Sumi | |
| 2007/0230842 A1 | 10/2007 | Tamaoka et al. | |

FOREIGN PATENT DOCUMENTS

| | | |
|---|---|---|
| JP | 1-143732 | 6/1989 |
| JP | 08-214480 | 8/1996 |
| JP | 9-147477 | 6/1997 |
| JP | 11-333529 | 12/1999 |
| JP | 2000-324773 | 11/2000 |
| JP | 2001-150052 | 6/2001 |
| JP | 2003-117623 | 4/2003 |
| JP | 2003-348812 | 12/2003 |
| JP | 2006-006017 | 1/2006 |
| JP | 2007-278313 | 10/2007 |
| JP | 2008-109793 | 5/2008 |

(Continued)

OTHER PUBLICATIONS

Japanese Office Action issued Sep. 18, 2012 in corresponding Japanese Patent Application No. 2011-070828.
Korean Office Action issued Sep. 8, 2011 in corresponding Korean Patent Application No. 10-2010-0093508.
Japanese Office Action issued Apr. 3, 2013 in corresponding Japanese Patent Application No. 2011-070828.

(Continued)

*Primary Examiner* — Joseph Feild
*Assistant Examiner* — Gustavo Polo

(57) ABSTRACT

There are provided a motor capable of preventing scratches from occurring on an outer surface of a rotor case thereof, a method for manufacturing the same, and an optical disk drive using the same. The motor includes a shaft rotatably inserted into a bearing assembly; and a rotor case fixedly fastened to the shaft and rotating together with the shaft, wherein the rotor case is provided with a chamfered part along the outer peripheral edge of the bottom surface thereof. The rotor case includes a rotor hub fastened to an end of the shaft; an extending part extending in an outer-diameter direction from the rotor hub; and a vertical extending part formed to be vertically extended downwardly in a shaft direction from an outer peripheral edge of the extending part and having the chamfered part formed on the bottom end surface thereof.

4 Claims, 10 Drawing Sheets

(56) References Cited

FOREIGN PATENT DOCUMENTS

| | | |
|---|---|---|
| JP | 2008-229710 | 10/2008 |
| JP | 2009-197729 | 9/2009 |
| JP | 2010-190426 | 9/2010 |

OTHER PUBLICATIONS

Office Action issued by the State Intellectual Property Office of P.R. China on Aug. 9, 2013 in the corresponding Chinese patent application No. 201110112174.3.

* cited by examiner

MOTOR AND OPTICAL DISK DRIVE USING THE SAME WITH CHAMFERED AND FRACTURED PARTS ON ROTOR CASE

CROSS-REFERENCE TO RELATED APPLICATIONS

This application claims the priority of Korean Patent Application No. 10-2010-0093508 filed on Sep. 28, 2010, in the Korean Intellectual Property Office, the disclosure of which is incorporated herein by reference.

BACKGROUND OF THE INVENTION

1. Field of the Invention

The present invention relates to a motor and an optical disk drive using the same, and more particularly, to a motor capable of preventing scratches from occurring on an outer surface of a rotor case, a method for manufacturing the same, and an optical disk drive using the same.

2. Description of the Related Art

Generally, a spindle motor provided in an optical disk drive serves to rotate a disk so that an optical pickup mechanism can read data recorded on the disk.

A spindle motor according to the related art is configured to include a stator formed by winding a coil around a core and a rotor, the rotations of which correspond to a voltage applied to the coil of the stator.

The rotor is configured to include a rotor case and a magnet attached to the rotor case. Further, the rotor is configured to be rotated by an electromagnetic force generated between the magnet and the coil of the stator.

The rotor case according to the related art is generally formed by press machining. That is, a separate rotor case is obtained by applying various kinds of forces to an upper portion and a lower portion of a flat steel plate to form a shape of the rotor case and finally, punching the shaped rotor case from the flat steel plate.

However, there is a problem in that burrs finely protruded outwardly of a surface separated from the steel plate occur on the rotor case according to the related art during the punching process. These burrs may cause scratches on the surfaces of adjacent components or rotor cases through contact therewith. Defects within motors may be caused due to these defects.

SUMMARY OF THE INVENTION

An aspect of an exemplary embodiment of the present invention, provides a motor capable of preventing burrs from occurring on an outer surface of a rotor case, a method for manufacturing the same, and an optical disk drive using the same. According to an aspect of the present invention, there is provided a motor, including: a shaft rotatably inserted into a bearing assembly; and a rotor case fixedly fastened to the shaft and rotating together with the shaft, wherein the rotor case is provided with a chamfered part along an outer peripheral edge of a bottom surface thereof.

The rotor case may include: a rotor hub fastened to an end of the shaft; an extending part extending in an outer-diameter direction from the rotor hub; and a vertical extending part formed to be vertically extended downwardly in a shaft direction from an outer peripheral edge of the extending part and having the chamfered part formed on the bottom end surface thereof. A fracture part having a rough surface may be formed on a top portion of the chamfered part along an outer peripheral edge of the vertical extending part.

The fracture part may be a cutting surface formed by pressurizing and cutting the rotor case by press machining.

The chamfered part may be formed to have any one of an inclined surface, a curved surface, and a groove.

According to another aspect of the present invention, there is provided an optical disk drive, including: a motor; and an optical pickup mechanism movably mounted in a lower space of a disk equipped in the motor and receiving data from the disk.

According to another aspect of the present invention, there is provided a method for manufacturing a motor, including: preparing a flat steel plate; forming at least one shape of a rotor case on the steel plate through press machining; forming a chamfered groove on a bottom end surface of the rotor case, along a cutting surface of the rotor case; and separating the rotor case by cutting the steel plate along the cutting surface.

The forming of the chamfered groove may form the chamfered groove by the press machining using a jig provided with a protrusion corresponding to the chamfered groove.

The separating of the rotor case may include: disposing the steel plate provided with the chamfered groove on a lower jig; and pressurizing the steel plate with an upper jig formed to have a size corresponding to the shape of the rotor case. The cross section of the chamfered groove may be formed to have any one of a triangular shape, a rectangular shape, and an arc shape.

The outer peripheral surface of the rotor case may be provided with the chamfered part by the chamfered groove along an outer peripheral edge of the bottom end surface thereof, and a top portion of the chamfered part is provided with the fracture part having a rough surface by the cutting surface.

The chamfered part may be formed to have any one of an inclined surface, a curved surface, and a groove.

According to another aspect of the present invention, there is provided a method for manufacturing a motor, including: preparing a flat steel plate; forming at least one shape of a rotor case on the steel plate by press machining; separating the rotor case by cutting the steel plate; and forming a chamfered part along the outer peripheral edge of the bottom end surface of the separated rotor case. The chamfered part may be formed to have any one of an inclined surface, a curved surface, and a groove.

According to another aspect of the present invention, there is provided a motor manufactured by any one of the methods set forth above.

According to another aspect of the present invention, there is provided an optical disk drive, including: a motor; and an optical pick up mechanism movably mounted in a lower space of a disk equipped in the motor and receiving data from the disk.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
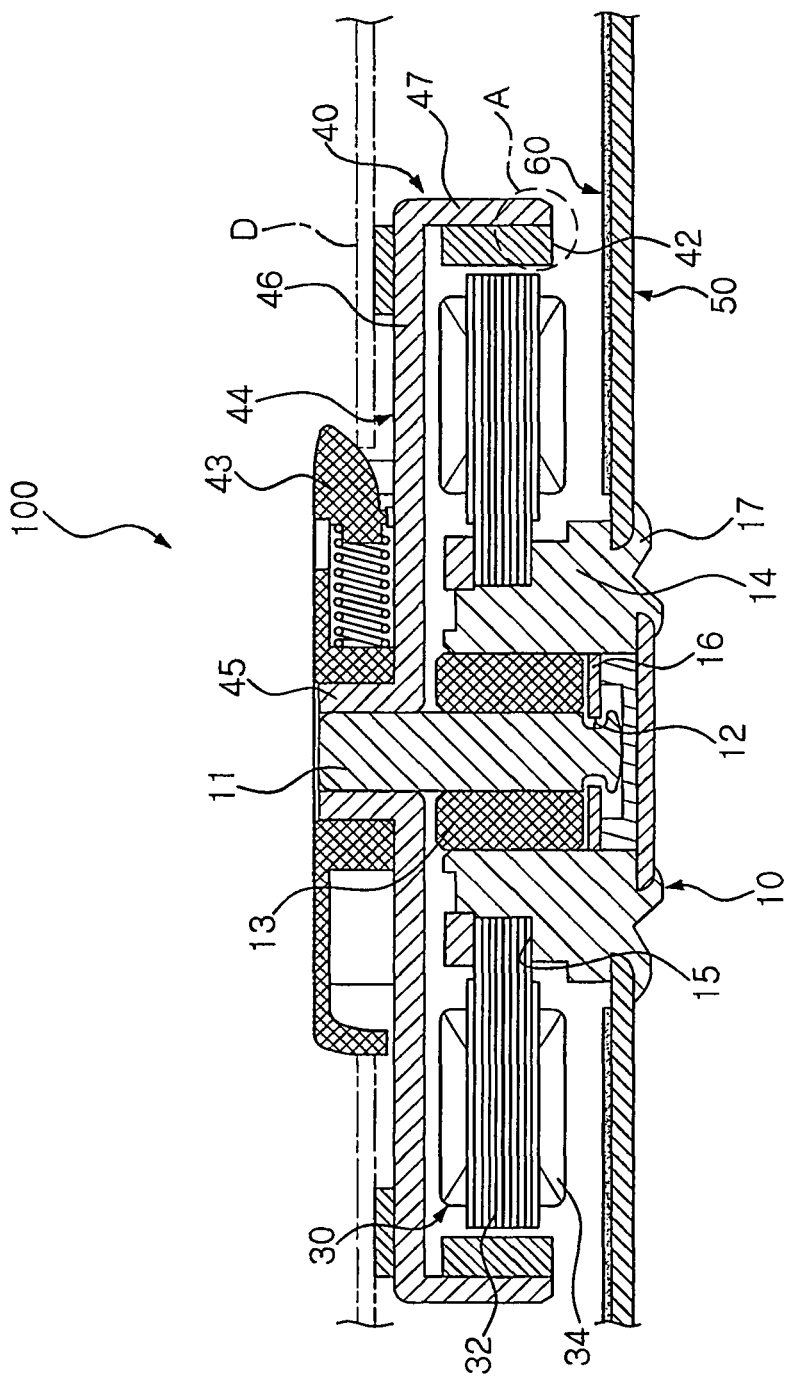
FIG. 1 is a cross-sectional view schematically showing a motor according to an exemplary embodiment of the present invention.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions may be exaggerated for clarity, and the same reference numerals will be used throughout to designate the same or like components.

Meanwhile, terms related to directions are defined. When viewed in FIG. 1, a shaft direction refers to a vertical direction based on an a shaft 11, while an outer-diameter direction or an inner-diameter direction respectively refers to an outer end direction of a rotor 40 based on the shaft 11, or a central direction of the shaft 11 based on the outer end of the rotor 40.

Hereinafter, exemplary embodiments of the present invention will be described in detail with reference to the accompanying drawings.

Figure 2:
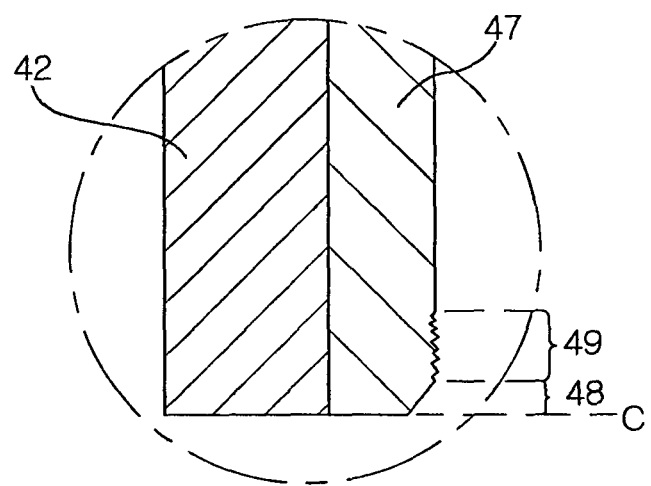
FIG. 2 is a partially enlarged cross-sectional view of portion A of FIG. 1.

FIG. 1 is a cross-sectional view schematically showing a motor according to an exemplary embodiment of the present invention and FIG. 2 is a partially enlarged cross-sectional view of portion A of FIG. 1.

Referring to FIGS. 1 and 2, the motor 100 according to an exemplary embodiment of the present invention is a spindle motor 100 applied to the optical disk driver rotating a disk D. The motor 100 is configured to include a bearing assembly 10, a base plate 50, a circuit substrate 60, a stator 30, and a rotor 40.

The bearing assembly 10 is configured to include a shaft 11, a sleeve 13, and a sleeve holder 14 supporting the shaft 11 and the sleeve 13.

The shaft 11 forms a rotational shaft of the rotor 40 to be described below. The shaft 11 according to the exemplary embodiment may be provided with a stopper ring fastening groove 12 having a stopper ring 16 inserted into the lower end thereof in order to prevent the shaft 11 from being separated from the sleeve 13 according to the high-speed rotation of the rotor case 44.

The sleeve 13 has the shaft 11 inserted into a hole formed therein and an oil film is formed therebetween to facilitate the rotation of the shaft 11. The sleeve 13 is a rotation supporting member supporting the shaft 11 and serves as a bearing. The outer peripheral surface of the sleeve 13 is press-fitted in the sleeve holder 14, to be described below, to be fixed thereto.

The sleeve holder 14 is a fixing structure rotatably supporting the shaft 11 therein and rotatably supporting the shaft 11 through the sleeve 13. The outer surface of the sleeve holder 14 is partially protruded in an outer-diameter direction so that the stator 30, to be described below, is seated therein, thereby forming a seating part 15 having a step.

In addition, the sleeve holder 14 includes a fastening rack 17 protruded downwardly in the shaft direction from the bottom surface thereof and fastened to the base plate 50, to be described below, and the base plate 50 is fixedly fastened to the sleeve holder 14 as the fastening rack 17 is bent to the base plate 50 through a caulking process, a spinning process, or the like.

The base plate 50, which is a supporting member entirely supporting other components of the motor 100, is formed to have a plate shape and has the above-mentioned sleeve holder 14 fixedly fastened thereto and the circuit substrate 60 fastened to one surface thereof.

The inside of the circuit substrate 60 is provided with circuit patterns (not shown) applying power to the motor 100 and the circuit substrate 60 is electrically connected to a winding coil 34 to apply power to the winding coil 34. In addition, a ground pattern, among the circuit patterns of the circuit substrate 60, may be conducted to the base plate 50. As the circuit substrate 60, various substrates such as a general printed circuit board (PCB), a flexible circuit board (FCB), or the like, may be optionally used, if necessary.

The stator 30 is a fixing structure configured to include a core 32 and a winding coil 34 wound on the core 32.

The core 32 is radially formed in the outer-diameter direction of the shaft 11, based on the shaft 11 as a central shaft, and is fixedly disposed on the top portion of the sleeve holder 14.

The winding coil 34 is a coil 34 wound on the core 32, which generates electromagnetic force when power is applied thereto. The winding coil 34 according to the exemplary embodiment of the present invention is electrically connected to the circuit substrate 60 through a lead wire (not shown) and is supplied with external power through the lead wire.

The rotor 40 is configured to include a magnet 42 and the rotor case 44 and a chucking mechanism 43 capable of mounting the disk D is combined with the top portion of the rotor 40.

The magnet 42 is an annular ring permanent magnet generating a magnetic force of a predetermined strength by alternately magnetizing an N pole and an S pole in a circumferential direction thereof.

The rotor case 44 is formed to have a cup shape to receive the stator 30 therein and is fixedly press-fitted to the shaft 11 to be rotated therewith. The rotor case 44 is configured to include a rotor hub 45, an extending part 46, and a vertical extending part 47.

FIG. 2 is a partially enlarged cross-sectional view of the portion A of FIG. 1. Referring to FIG. 2, the rotor hub 45 is press-fitted in the top end portion of the shaft 11 to be fixedly fastened thereto and is formed to be upwardly bent in the shaft direction in order to maintain an unmating force with the shaft 11. The chucking mechanism 43 is combined with the outer peripheral surface of the rotor hub 45.

The extending part 46 is formed to be extended in an outer-diameter direction along the top end surface of the bearing assembly 10 from the rotor hub 45. The motor 100 according to the exemplary embodiment of the present invention is formed to receive the stator 30 in the rotor case 44. Therefore, the extending part 46 according to the exemplary embodiment of the present invention is formed to have a size extended to be larger than the size of the stator 30.

The vertical extending part 47 is formed to be vertically extended downwardly in the shaft direction from the outer peripheral edge of the extending part 46 and the inner peripheral surface thereof has the magnet 42 fastened thereto. In this configuration, the magnet 42 is disposed to be opposite to the core 32 on which the winding coil 34 is wound. Therefore, when power is applied to the winding coil 34, the rotor 34 is rotated by the electromagnetic interaction between the magnet 42 and the winding coil 34. The shaft 11 and the chucking mechanism 43 fastened to the rotor case 44 are rotated together due to the rotation of the rotor 40.

In the motor 100 according to the exemplary embodiment of the present invention, a chamfered part 48 is formed along the outer peripheral edge of the bottom end surface of the vertical extending part 47 and a fracture part 49 is formed along the outer peripheral surface of the vertical extending part 47 from the top portion of the chamfered part 48.

The chamfered part 48 is entirely formed on the bottom end surface C along the outer peripheral surface of the bottom end surface C of the vertical extending part 47 in the rotor case 44. The chamfered part 48 according to the exemplary embodiment of the present invention is formed to have an inclined surface; however the exemplary embodiment of the present invention is not limited thereto and may be formed as various types such as those of other exemplary embodiments to be described below.

The fracture part 49 is formed as a band along the outer peripheral surface of the vertical extending part 47. In particular, the fracture part 49 according to the exemplary embodiment of the present invention is not formed on the bottom end portion of the outer peripheral edge of the vertical extending part 47, but rather is formed at a position spaced apart upwardly by a predetermined distance from the bottom end portion of the outer peripheral edge of the vertical extending part 47. This spaced distance is set by the above-mentioned chamfered part 48.

The fracture part 49 is formed to have a rough surface that is not ground and is formed to come into contact with the chamfered portion 48 at the top portion of the chamfered part 48. The fracture part 49 is a cutting surface generated when the rotor case 44 is separated from a steel plate (80 of FIG. 3A) to be described below by press machining (for example, punching processing). The fracture part 49 will be described in more detail, in a method for manufacturing a motor to be described below.

Next, a method for manufacturing a motor 100 according to an embodiment of the present invention will be described. The exemplary embodiment of the present invention is characterized by a method for manufacturing a rotor case. A method for manufacturing components other than the rotor case may be generally manufactured by a method known in the art. Therefore, the detailed description thereof will be omitted and the method for manufacturing a rotor case will be mainly described.

Figure 3A:
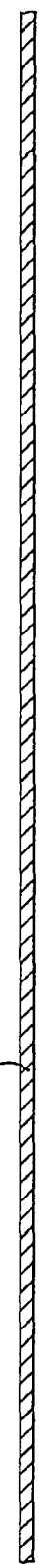
FIGS. 3A to 3E are diagrams for explaining a method for manufacturing a rotor case of FIG. 1.

FIGS. 3A to 3E are diagrams for explaining a method for manufacturing the rotor case 44 shown in FIG. 1. Referring first to FIG. 3A, a step S1 of preparing a flat steel plate 80 is performed. As the steel plate 80 according to the exemplary embodiment of the present invention, various kinds of steel plates may be used as long as they may be press machined, in particular, a zinc-coated steel plate 80 may be used.

Figure 3B:
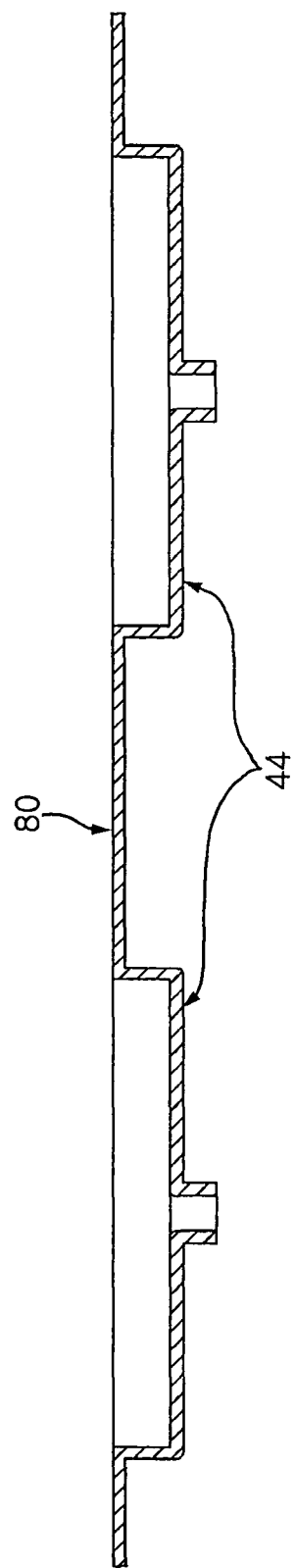

Then, a step S2 of forming a shape of at least one rotor case 44 on the steel plate 80 by machining the steel plate 80 prepared as shown in FIG. 3B is performed, which may be performed by press machining. In this case, a plurality of rotor cases 44 may be simultaneously formed on a single steel plate 80.

Figure 3C:
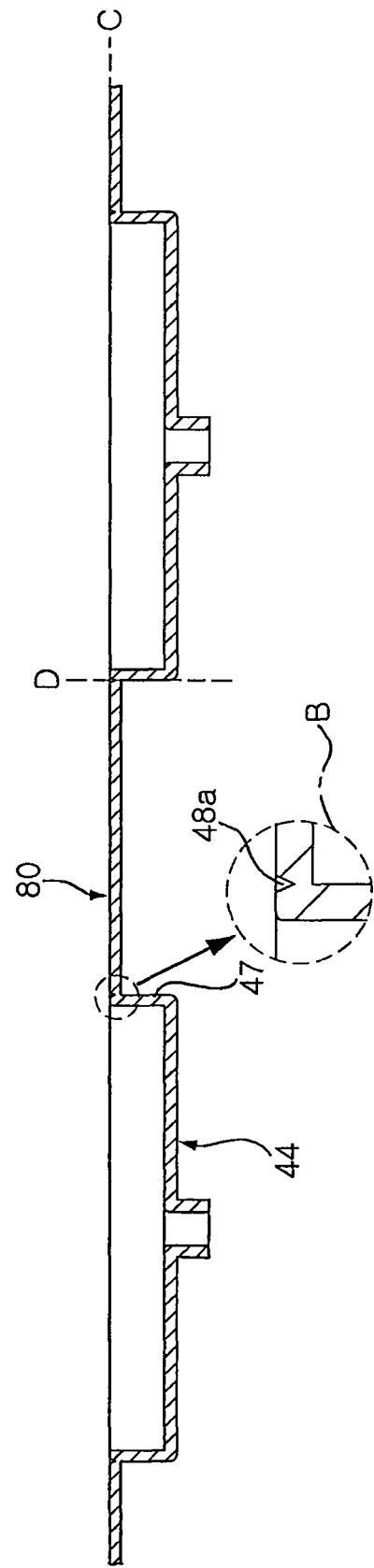

When the shape of the rotor case 44 is formed in the steel plate 80, then as shown in FIG. 3C, a step S3 is performed in which a chamfered groove 8a on the bottom end surface C is formed in order to correspond to the outer peripheral surface of the rotor case 44.

The rotor case 44 according to the exemplary embodiment of the present invention is provided with the cutting surface D along the outer peripheral surface of the vertical extending part 47. Therefore, the chamfered groove 48a is formed on the bottom end surface C of the rotor case 44 along the cutting surface D and at least a portion thereof is formed to be positioned in the inside of the rotor case 44 based on the outer peripheral surface of the vertical extending part 47 of the rotor case 44.

The chamfered groove 48a is formed as the above-mentioned chamfered part 48 after the rotor case 44 is manufactured.

The chamfered groove 48a according to the exemplary embodiment of the present invention may be formed by the press machining. That is, the chamfered groove 48a may be formed by pressurizing the steel plate 80 provided with the rotor case 44 using a jig (not shown) on which a protrusion corresponding to the chamfered groove 48a is formed. However, the present invention is not limited thereto and therefore, various methods such as a method of forming the steel plate 80 using cutting machining, or the like, may be used.

In addition, due to the formation of the chamfered groove 48a, the portion of the cutting surface D is not formed up to a position corresponding to the bottom end surface C of the rotor case 44 and is formed to be spaced apart from the bottom end surface C of the rotor case 44 by a predetermined distance. Thus, the thickness of the portion of the cutting surface D is formed to be thinner than that of other portions of the steel plate 80.

Meanwhile, the exemplary embodiment of the present invention will describe, for example, the case in which the chamfered groove 48a is formed to have a 'V' shape. However, the present invention is not limited thereto and therefore, various applications can be made, as in the exemplary embodiments to be described below.

Figure 3D:
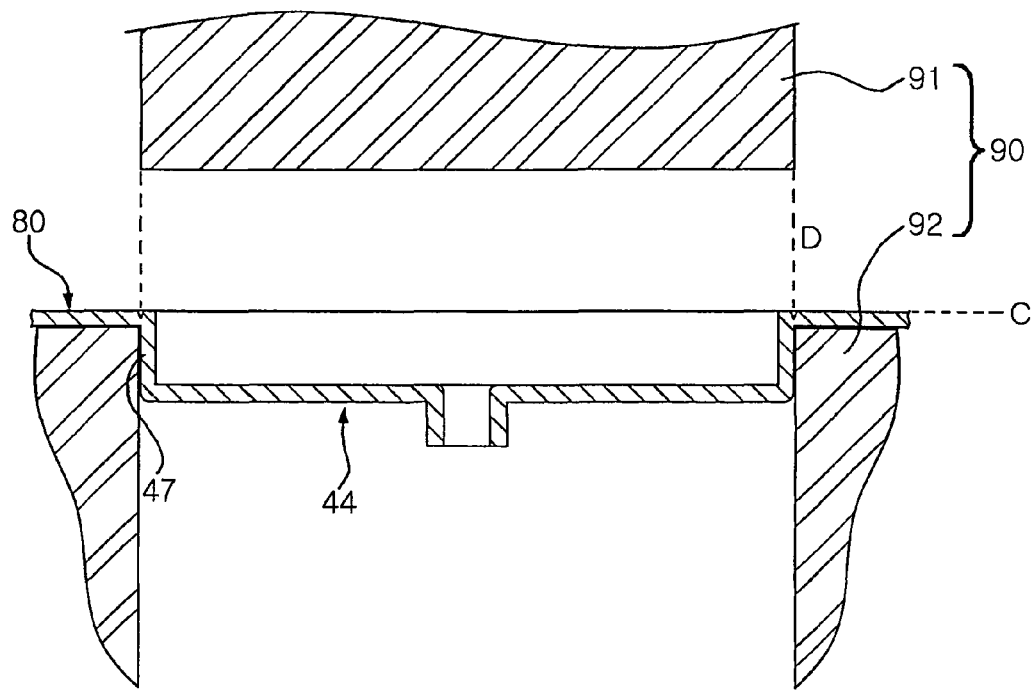

Next, as shown in FIG. 3D, a step S4 of separating the rotor case 44 formed with the chamfered groove 48a from the steel plate 80 is performed. This step is performed by disposing the steel plate 80 formed with the rotor case 44 on a lower jig 92 and pressurizing the steel plate 80 with an upper jig 91 having a shape corresponding to the shape of the rotor case 44.

Figure 3E:
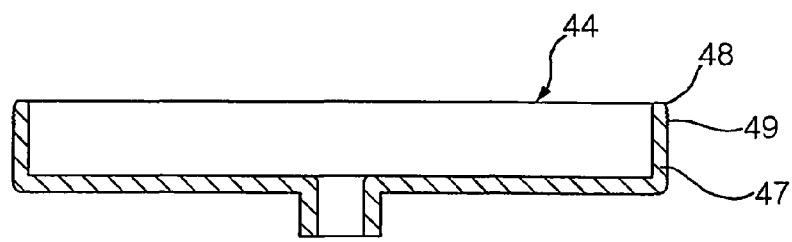

Therefore, the rotor case 44 is cut along the cutting surface D due to the pressure of the jig 90 and finally, as shown in FIG. 3E, the rotor case 44 including the chamfered part 48 is separated from the steel plate 80.

In this case, the cutting surface D of the rotor case 4 cut from the steel plate 80 is formed as the fracture part 49. Therefore, the fracture part 49 according to the exemplary embodiment of the present invention is formed to have a non-ground, rough surface and is formed to have a width corresponding to the thickness of the portion of the cutting surface D.

The method for manufacturing the rotor case according to the exemplary embodiment of the present invention could allow for minimizing the thickness of the cutting surface D (fracture part) due to the chamfered groove 48a formed prior to cutting. Therefore, the occurrence of burrs in the fracture part 49 could be minimized during the cutting.

Figure 4A:
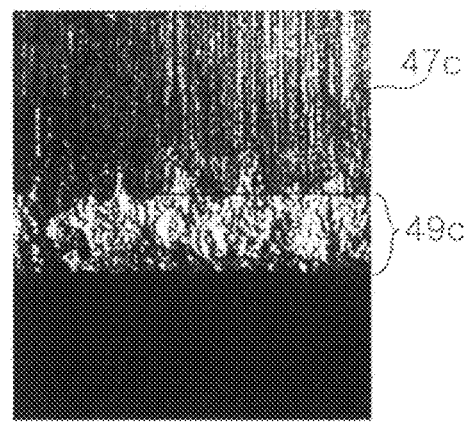
FIG. 4A is a photograph of an outer peripheral surface of a vertical extending part of a rotor case according to the related art.
Figure 4B:
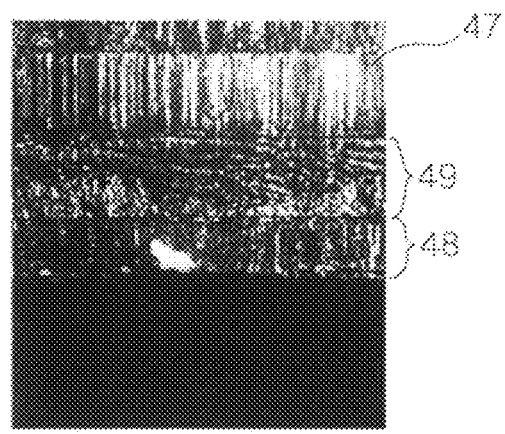
FIG. 4B is a photograph of an outer peripheral surface of a vertical extending part of a rotor case according to the related art.

FIG. 4A is a photograph of an outer peripheral surface of a vertical extending part of a rotor case according to the related art; and FIG. 4B is a photograph of an outer peripheral surface of a vertical extending part of a rotor case according to the related art.

In the related art, the rotor case is not provided with the chamfered part, unlike that of the exemplary embodiment. As shown in FIG. 4A, the cutting surface 49c is formed up to the bottom end portion of the vertical extending part 47c and therefore, the burrs protruded from the cutting surface 49c are protruded to the lower portion of the vertical extending part 47c of the rotor case. As described above, the protruded burrs may cause scratches through contact with other components.

However, the rotor case 44 according to the exemplary embodiment of the present invention is spaced apart from the bottom end surface C, to such a degree that the chamfered part 48 is formed, without the cutting surface D (i.e., fracture part) formed up to the bottom end portion of the vertical extending part 47. Accordingly, even though burrs may occur in the fracture part 49 during the cutting, they are not protruded to the bottom portion of the vertical extending part 47 due to the chamfered part 48 formed at the bottom side of the fracture part 49.

Therefore, the motor 100 according to the exemplary embodiment of the present invention can prevent scratches from being caused by contact between burrs protruded from the bottom end surface C of the rotor case 44 and other components, as in the related art.

The rotor case 44 manufactured by the above-mentioned method is combined with the bearing assembly 10, the stator 30, and the like, which are separately manufactured, thereby completing the motor 100 according to the exemplary embodiment of the present invention.

The motor 100 according to the exemplary embodiment of the present invention is not limited to the foregoing exemplary embodiments and therefore various application may be made.

The following exemplary embodiments are configured to have a structure similar to the motor 100 (FIG. 1) of the above-mentioned exemplary embodiments and therefore have a difference therewith only in terms of the structure of the rotor case. The detailed description of the same components will be omitted and the rotor case will be mainly described in more detail.

Figure 5A:
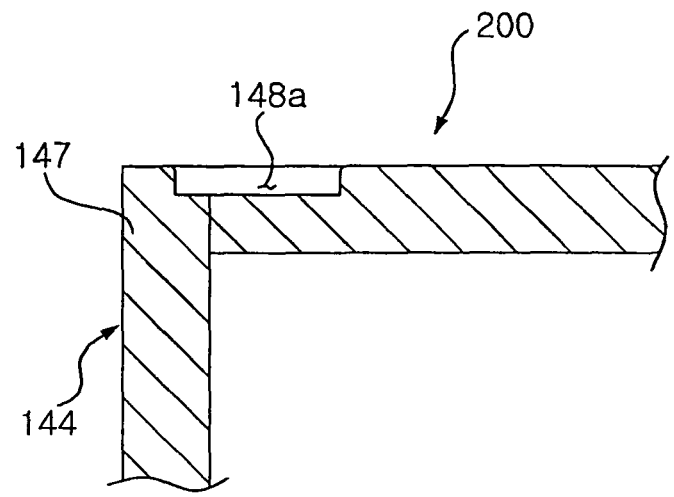
FIGS. 5A and 5B are cross-sectional views for explaining a rotor case according to another exemplary embodiment of the present invention.
Figure 5B:
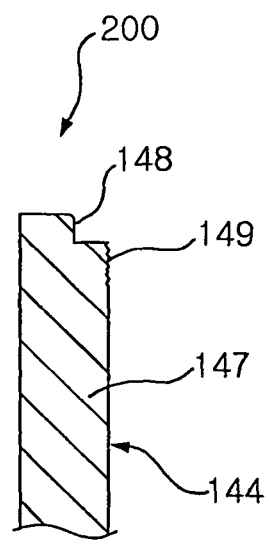

FIGS. 5A and 5B are cross-sectional views for explaining a rotor case according to another exemplary embodiment of the present invention;

FIG. 5A is a partially enlarged cross-sectional view of a portion corresponding to B of FIG. 3C in the above-mentioned exemplary embodiment. Referring to this, a chamfered groove 148a in a motor 200 according to the exemplary embodiment of the present invention is not formed to have a triangular cross section such as 'V' as in the above-mentioned exemplary embodiment, rather, the chamfered groove 148a is formed to have a rectangular cross section. In this case, similar to the above-mentioned exemplary embodiment, the chamfered groove 148a is formed at a position corresponding to the outer peripheral surface of the vertical extending part 147 of a rotor case 144 and at least a portion thereof is formed to be positioned on the inside of the rotor case 144 based on the outer peripheral surface of the vertical extending part 147 of the rotor case 144.

When the rotor case 144 shown in FIG. 5A is cut from the steel plate, the rotor case 144 having a form shown in FIG. 5B may be obtained.

Figure 6A:
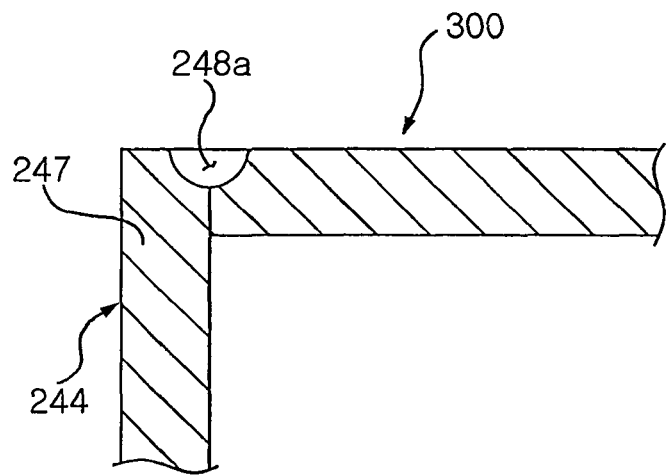
FIGS. 6A and 6B are cross-sectional views for explaining a rotor case according to another exemplary embodiment of the present invention.
Figure 6B:
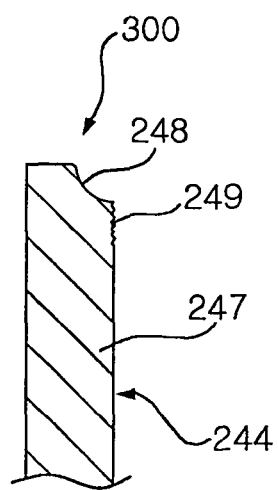

FIGS. 6A and 6B are cross-sectional views for explaining a rotor case according to another exemplary embodiment of the present invention.

FIG. 6A is a partially enlarged cross-sectional view of a portion corresponding to B of FIG. 3C in the above-mentioned exemplary embodiment. Referring to this, the chamfered groove 248a according to the exemplary embodiment of the present invention is formed to have a cross sectional arc shape (or semicircular shape). In this case, similarly to the above-mentioned exemplary embodiments, the chamfered groove 248a is formed at the position corresponding to the outer peripheral surface of the vertical extending part 247 of a rotor case 244 and at least a portion thereof is formed to be positioned in the inside of the rotor case 244 based on the outer peripheral surface of the vertical extending part 247 of the rotor case 244.

When the rotor case 244 shown in FIG. 6A is cut from the steel plate, the rotor case 244 having a form shown in FIG. 6B may be obtained.

As described above, in the motors 100, 200, and 300 according to the exemplary embodiment of the present invention, the chamfered groove formed during the manufacturing of the rotor case is not limited to a specific shape and therefore, may be formed to have various shapes such as a triangular shape, a quadrangular shape, an arc shape, or the like. Therefore, the chamfered shape of the rotor case according to the exemplary embodiments of the present invention may be formed to have various shapes such as an inclined surface, a curved surface, a groove, or the like, as shown in FIGS. 2, 5B, and 6B.

Meanwhile, the above-mentioned exemplary embodiments describe, for example, the case in which the chamfered groove is first manufactured during the manufacturing of the rotor case and then cutting is performed thereon. However, the present invention is not limited thereto.

For example, the step S3, of forming the above-mentioned chamfered groove 48a, may be omitted and the step S4 of separating the rotor case by cutting the rotor case from the steel plate 80 may be initially performed. In this case, a step S5 of forming the chamfered part 48 along the outer peripheral edge of the bottom end surface of the separated rotor case may be additionally performed. Here the chamfered part 48 may be ground and formed to have a shape such as an inclined surface, a curved surface, a groove, or the like.

Figure 7:
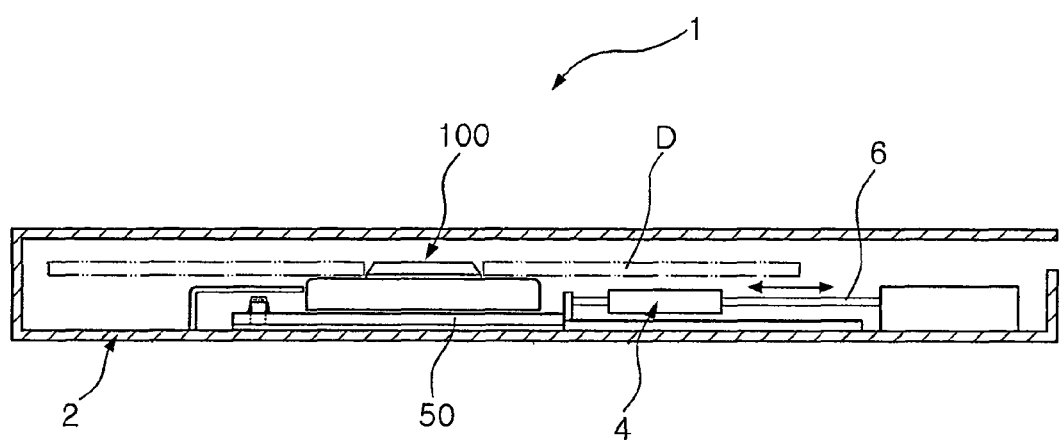
FIG. 7 is a cross-sectional view schematically showing an optical disk drive according to an exemplary embodiment of the present invention.

FIG. 7 is a cross-sectional view schematically showing an optical disk drive according to an exemplary embodiment of the present invention.

Referring to FIG. 7, an optical disk drive 1 according to the exemplary embodiment of the present invention is equipped with the motor 100 according to the foregoing exemplary embodiment of FIG. 1. However, the present exemplary embodiments are not limited thereto and the optical disk drive 1 may be equipped with any one of the motors 100 and 200 according to the foregoing exemplary embodiments.

The optical disk drive 11 according to the exemplary embodiment of the present invention may include a frame 2, an optical pickup mechanism 4, and a moving mechanism 6.

The frame 2 serves as a case of the optical disk drive 1 and the inside thereof is fixed with the base plate 50 of the motor 100.

The optical pick up mechanism 4 is equipped to move in the lower space of the disk D equipped on the motor 100 and receives data from the disk D.

The moving mechanism 6 transfers the optical pickup mechanism 4 in a diameter direction of the disk D to allow the optical pickup mechanism 4 to perform the receiving function of data over the entire surface of the disk D.

Meanwhile, the motor, the method for manufacturing the same, and the optical disk drive using the same according to the exemplary embodiment of the present invention are not limited to the foregoing exemplary embodiments and therefore, may be variously modified by those skilled in the art within the technical scope of the present invention.

For example, in the foregoing exemplary embodiments, forming the chamfered groove is separately performed, after forming the shape the rotor case during the manufacturing of the rotor case; however, the present invention is not limited thereto and the forming of the chamfered groove may be performed together with the forming of the rotor case.

Further, the exemplary embodiments describe, for example, a motor provided in an optical disk drive; however, the motor is not limited thereto. The present invention may be variously applied any motor, as long as the motor has a structure in which the circuit substrate is attached to the base plate. As set forth above, in the motor, the method for manufacturing the same, and the optical disk drive using the same according to the exemplary embodiment of the present invention, the chamfered part is formed on the bottom end of the outer peripheral surface of the rotor case, and the fracture part (i.e., cutting surface) is formed to be spaced apart from the bottom end surface, to such a degree that the chamfered part is formed, without being formed up to the bottom end surface of the vertical extending part of the rotor case.

Therefore, according to the embodiments of the present invention, the thickness of the fracture part could be minimized, thereby making it possible to minimize the occurrence of burrs on the fracture part during the cutting process.

Further, even though the burrs may occur, the burrs are not protruded downwardly the rotor case by the chamfered part formed on the bottom side of the fracture part.

Therefore, the motor, according to the exemplary embodiments of the present invention, can easily prevent the scratches from being caused by the rotor case contacting other components due to the burrs protruded from the bottom end surface of the rotor case as in the related art.

While the present invention has been shown and described in connection with the exemplary embodiments, it will be apparent to those skilled in the art that modification and variation can be made without departing from the spirit and scope of the invention as defined by the appended claims.

What is claimed is:

1. A motor, comprising:
    a shaft rotatably inserted into a bearing assembly; and
    a rotor case fixedly fastened to the shaft, and the rotor case rotating together with the shaft and including a rotor hub fastened to an end of the shaft, an extending part extending in an outer-diameter direction from the rotor hub, a chamfered part along an outer peripheral edge of a bottom surface thereof, and a vertical extending part formed to be vertically extended downwardly in a shaft direction from an outer peripheral edge of the extending part and having the chamfered part formed on the bottom end surface thereof,
    wherein a fracture part having a rough surface is formed to come into contact with the chamfered part at a top portion of the chamfered part along an outer peripheral edge of the vertical extending part.

2. The motor of claim 1, wherein the fracture part is a cutting surface formed by pressurizing and cutting the rotor case by press machining.

3. An optical disk drive, comprising:
    a motor of claim 1; and
    an optical pickup mechanism movably mounted in a lower space of a disk equipped in the motor and receiving data from the disk.

4. The motor of claim 1, wherein the chamfered part is formed to have any one of an inclined surface, a curved surface, and a groove.

* * * * *